United States Patent
Ghose

[15] 3,642,580
[45] Feb. 15, 1972

[54] ENZYMATIC SACCHARIFICATION OF CELLULOSE

[72] Inventor: Tarun K. Ghose, Ashland, Mass.

[73] Assignee: The United States of America as represented by the Secretary of the Army

[22] Filed: Jan. 8, 1970

[21] Appl. No.: 1,478

[52] U.S. Cl. .................................. 195/33 R, 195/66 R
[51] Int. Cl. ................................................ C12d 13/04
[58] Field of Search ............................. 195/31, 33, 8, 66

Primary Examiner—A. Louis Monacell
Assistant Examiner—Gary M. Nath
Attorney—Harry M. Saragovitz, Edward J. Kelly, Herbert Berl and Lawrence E. Labadini

OTHER PUBLICATIONS

Reese et al. Methods in Carb. Chem. Vol. III "Enzymic Hydrolysis of Cellulose", pp. 139-143

[57] ABSTRACT

A method of enzymatically converting cellulose to simple sugars wherein finely divided dry cellulose, less than 150 micron particle size, is combined with a concentrated cellulase enzyme solution obtained from *Trichoderma viride* QM 9123 to form a slurry having a cellulose solids content of 10 to 30 percent, and after hydrolysis the soluble sugar components are removed by pressure filtration through a molecular sieve membrane without any enzyme passing in the effluent.

6 Claims, 1 Drawing Figure

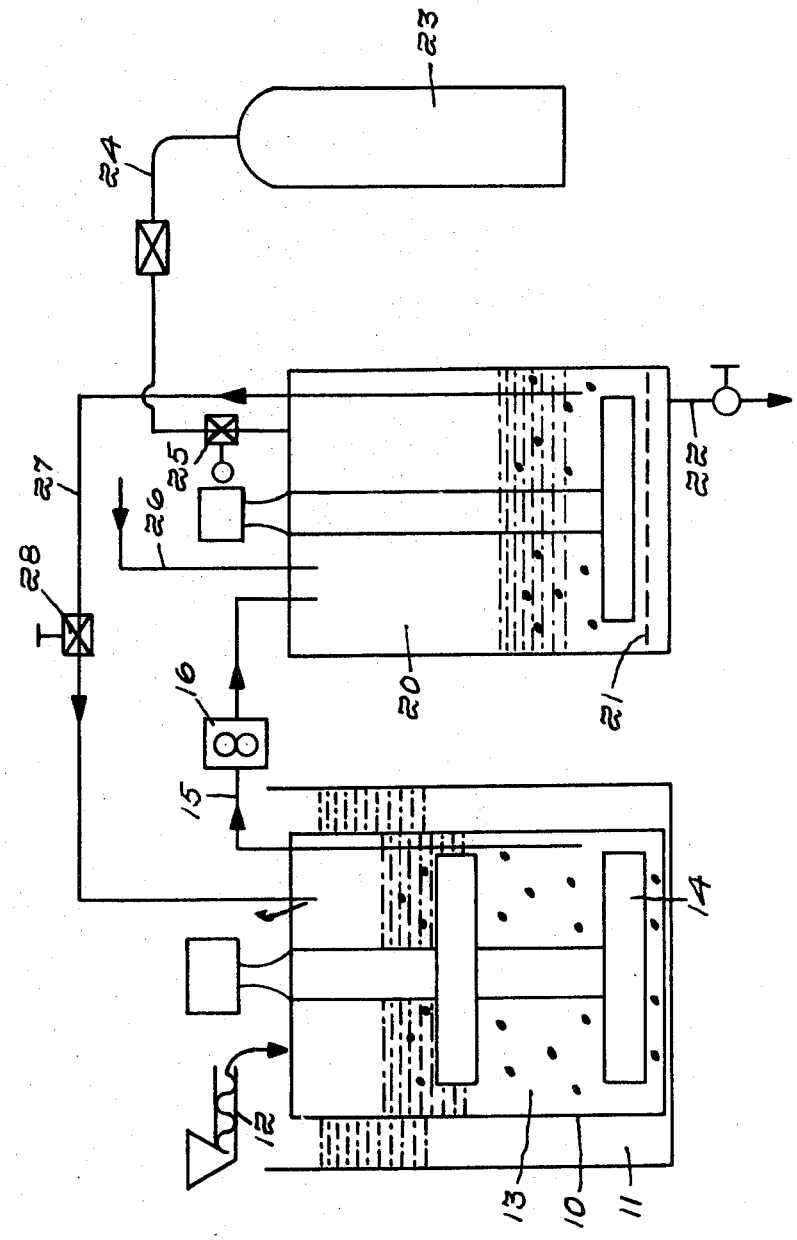

ENZYMATIC SACCHARIFICATION OF CELLULOSE

The invention described herein may be manufactured, used, and licensed by or for the Government for governmental purposes without the payment to me of any royalty thereon.

This invention relates to a novel process for the rapid and complete hydrolysis of cellulose into glucose, cellobiose, and other simple sugars and for the separation of the sugar products free of the other reactants.

Cellulose is said to be the most abundant natural polymer on the earth and is the substance forming the walls of all plant cells. Such common items as cotton, wood, paper, plant waste consist exclusively or principally of cellulose. While some animals, insects, and fungi are capable of breaking down cellulose to nutritionally useful products, man cannot convert cellulose in his digestive tract to nutritionally useful products. Since cellulose is such an abundant raw material and constitutes a substantial portion of industrial waste, it would be of great benefit to mankind if a way could be found to economically convert this cellulose to nutritionally useful products. This would then provide a substantial source of food in times of crisis while reducing the quantity of useless waste constantly being generated.

The past, extensive attempts have been made to convert cellulose to glucose by chemical degradation, namely, by mineral acid hydrolysis, but such degradation processes have not been successful as commercial ventures. More recently, interest has been shown in the use of enzymes to effect hydrolysis of cellulose to glucose, but as yet no satisfactory enzymatic process has been developed.

A few important factors seem to be responsible for not making the results of enzymatic hydrolysis of cellulose attractive for commercial utilization. These are (a) the low level of activity of the enzyme available, (b) the resistant nature of the cellulosic substances, (c) the difficulty involved in removing sugar components free from the reactants and, (d) the high cost of replenishing enzyme material.

This invention provides a novel process for the rapid and complete hydrolysis of cellulose into glucose and other simple sugars, and, also an efficient process for separation of sugar components from the reactants without any significant loss of enzyme used in the system. In more detail, a highly active cellulase enzyme solution is allowed to react with a highly reactive cellulosic substrate and the sugar products are removed from the solution by a molecular sieve, pressure filter which separates the sugar components as an aqueous solution and allows the reuse of the enzyme and unreacted substrate.

It is, therefore, among the objects of the present invention to provide a process for the rapid enzymatic conversion of cellulose into simple sugars. It is also an object to provide a process which will allow the removal of the sugar components free of enzyme or cellulose. It is also an object to provide a process that is economical in terms of enzyme required per unit of glucose produced in that none of the enzyme is found in the sugar filtrate. These and other objects will become apparent from the following detailed description taken together with the accompanying drawing which is a schematic diagram of the process of the instant invention.

Several microorganisms in nature, mostly fungi, are capable of elaborating a complex enzyme system which is responsible for hydrolyzing cellulose into simple sugars. The exact mechanism of enzyme breakdown of cellulose into soluble materials is not clear and it has not been possible to clearly confirm the specific enzyme components and their interrelationship responsible for the sequential breakdown of the cellulose fibers. Among the micro-organisms, the fungus *Trichoderma viride* has been found to be, thus far, the most important, in that its growth and elaboration of extra-cellular cellulase are not complicated by unpredictable factors. Removal of mycelium and adjustment of pH are the only steps necessary for making the crude enzyme. The preferred organism for the production of cellulase is obtained from *Trichoderma viride* (Tv) mutant QM 9123 produced by the irradiation of the parent strain (Tv QM 6a) with a high energy electron beam of a linear accelerator. This mutant strain has a two fold increase in activity over the parent strain. The organism is cultured in a mineral medium containing 1 percent cellulose in shake flasks or submerged cultures. After 10-14 days culture at 28-29° C., the culture broth is filtered off to remove the mycelium and the pH adjusted to 4.8-5.0. The production of cellulase is described in detail in an article by Mandels and Weber entitled "The Production of Cellulases" appearing in the *Advances in Chemistry Series* ACS, 1969.

The activity of the cellulase can be expressed or measured by the carboxymethylcellulose hydrolysis method (Cx units/ml.) or the Filter Paper Assay Procedures (FP activity) which procedures are described in Mandels and Weber paper referred to above. The activity of freshly prepared culture filtrates ranges from about 40 to about 80 Cx units/ml. which is a twofold increase in activity over that produced by the parent (Tv QM 6a) organism. A more highly active enzyme solution is required, however, if rapid hydrolysis of cellulose is to be achieved. Attempts heretofore to vacuum concentrate the enzyme have not proven successful. The Tv culture filtrate, however, according to the present invention, has been concentrated over molecular sieve, polymeric membranes in pressure filters with an operating pressure from 40–50 lbs./sq. in. Membranes having molecular size cutoff capabilities of from 2,000 to 30,000 are effective in concentrating the cellulose enzymes. A six to eightfold volume concentration achieved by such molecular sieve membranes results in a corresponding three to fourfold increase in activity of enzymes as measured by the above assay procedures. For purposes of this invention, the cellulase should have an activity of at least 100 Cx units/ml., and, preferably, in excess of 120 Cx units/ml.

Cellulose is a straight chain polymer of glucose units, and if it could be completely hydrolyzed, would be converted to glucose or to glucose and other polysaccharides such as cellobiose, cellotriose, cellotetraose and cellopentaose. Cellulose is found in all plant materials and is widely available as a byproduct or waste material of many industrial processes. It is important, for this invention, that the cellulose be substantially pure, i.e., not contain significant amounts (more than 1 percent) of noncellulosic materials or any material toxic to cellulase. It is also essential that the resistance nature of native cellulose due to the strong H-bonding across the cellulose chains of crystalline microfibrils be overcome by rupturing the cell fibers and reducing the particle size to increase the reactive surface. The particle size of the cellulose should be reduced to less than 150 microns and preferably for purposes of this invention below 25 microns. Pure cellulose, such as that obtained from wood pulp, is dried and then dry-milled in a porcelain pot mill or some other suitable pulverizer until the particle size is reduced to less than 150 microns. Further reduction in particle size will increase the rate of reaction with the enzyme. It has been found that dry cellulose (less than 3 percent moisture by weight) is more reactive when added to the enzyme solution than wet cellulose.

In addition to the reduction in particle size of the cellulose substrate, the ratio of substrate to enzyme has marked effects on the reaction rate. Dense suspensions of finely ground cellulose, wherein the solids contents of the substrate in the cellulase suspension comprises 10 to 30 percent are found to be highly reactive in a system in which the suspension is vigorously agitated in the presence of a highly concentrated enzyme solution. Reduction of particle size of cellulose pulp by fine filling increases the bulk density of the suspension and reduces the size of the cellulose pulp from a level at which 80 percent of the particles are less than 149 microns to a level at which 100 percent of the principles are less than 25 microns and increases reactor capacity by sevenfold. Reacting dense (10 to 30 percent solids content) suspensions of finely milled cellulose (less than 25 microns) in concentrated enzyme solutions having a cellulase activity greater than 100 Cx units/ml. under suitable conditions of temperatures (40° to 60° C. and preferably about 50° C.) results in a production of 12–14% sugar calculated from the weight loss of the substrate) in a 24 hour period. It is necessary, however, to remove the sugar products from the suspension to prevent product inhibition. The system works most efficiently if the sugar products are continually being removed.

Removal of sugar products from the dense cellulose-cellulase-sugar system heretofore constituted a serious obstacle to the development of a practical process. According to the present invention, the sugar components of the system are removed by pressure filtration through a molecular sieve membrane. Molecular sieve membranes are filters formed of synthetic hydrated polymers, such as cellulose acetate and other types and are available with specific molecular weight cutoff values. Such polymeric membranes behave as remarkably discriminating permselective membranes because of the combined dependence of permeability on solubility and diffusivity. Membranes having molecular weight cutoff values of from 2,000 to 30,000 are satisfactory for separating sugar from the system. Such membranes remove the sugar products in a clear solution without passing any of the enzyme or having its pores blocked by either the enzyme or substrate. The rates of such ultrafiltration are functions of the solids content, apparent viscosity, total soluble sugars and density of the slurry system. The membranes are employed in an ultrafiltration cell in which the slurry can be held under constant pressure of from 40–50 lbs./sq. inch and under a constant temperature of approximately 50° C. Means are included within the cell to agitate the slurry in order to cut down the concentration polarization developed. As the ultrafiltration of sugar solution proceeds, water buffered to the proper pH (4.8–5.0) is added to the system to maintain the slurry volume constant.

Referring to the drawing, there is illustrated a flow diagram of a system for carrying out the instant invention. The concentrated cellulase enzyme solution is contained within a stirred tank reactor 10 which in turn is immersed within a water bath 11 to maintain the desired temperature inside the reactor. Dry, finely ground, cellulose is added to the reactor from an overhead feeder 12. The dense slurry 13 of cellulose in cellulase solution is kept under constant agitation by means of a motor driven, propeller agitator 14. After hydrolysis occurs a portion of the slurry containing soluble sugars is drawn through conduit 15 by pump 16 to the membrane separation cell 20. The sugar components pass through the membrane 21 in a clear solution which is withdrawn from the cell through a valved, cell effluent line 22. Pressure of 40–50 lbs./sq. in. within the cell is maintained by nitrogen gas or any other gas inert and sparingly soluble in the slurry from a pressure cylinder 23 which passes through gas line 24 controlled by pressure valve 25 to the cell. Water or a dilute cellulase enzyme solution buffered to the desired pH is introduced into the cell via a fluid entry line 26 to make up for the volume of sugar solution withdrawn from the cell. The slurry is returned to the reactor 10 by conduit 27 having a valve 28 to control the flow of material.

The following Examples describe in detail the process of this invention.

EXAMPLE 1

A continuous saccharification system (membrane reactor) was set up using a model 400 Amicon cell as the reactor vessel which is furnished with a 20,000 cutoff membrane (76 mm. diameter). A flexible heating tape (one-half inches wide, 110V, 480 watts) was wrapped around the polycarbonate cylinder. The input was controlled by a Honeywell Thermistor Sensor with a temperature probe connected with the reactor contents which was kept at 50° C. 200 ml. of a 20 percent milled cellulose (less than 37 micron particle size)—cellulase (280 Cx units/ml.) suspension which was predigested at 50° C. for 46 hours was pumped into the membrane cell and kept under agitation. The reactor was then pressurized with nitrogen up to 46 lbs./sq. in. and was connected with a pre-pressurized (50 lbs./sq. in.) agitated reservoir containing 10 percent aqueous suspension (0.098 gm./ml.) of the same substrate. As in a normal ultrafiltration system the reservoir (substrate slurry supply vessel) and the membrane cell (the reactor) were connected with an $N_2$ cylinder and desired pressures were maintained in the two units. Flow of substrate slurry into the reactor continued at the same rate as the aqueous solution of reaction products (sugars) was discharged by the cell. Soon equilibrium conditions were attained for both flow and reaction rate. Glucose concentration in the effluent has an average value around 7.5 percent and based on equal input and output rates, the average rate of removal of sugars from the membrane reactor is 0.074 g./min. The average percentage conversion of 76.6 percent is, therefore, fairly high. After an operation of over 8 hours with almost steady flux rates the process was stopped and the reactor opened (490th minute). Analyses showed a total sugar 8.93 percent; the corresponding effluent sample at this point showed a sugar value of 7.64 percent. Thus, the actual conversion seems to be higher than calculated from effluent sugar values and the permeation rate appears to be the controlling factor. The membrane was subsequently found to be in excellent condition.

EXAMPLE 2

*Trichoderma viride* culture (QM 9123) filtrate (48 Cx units/ml.) was concentrated eightfold through a membrane having a cutoff of 10,000 and pH adjusted to 4.85. The activity of the concentrated enzyme solution was 380 cx units/ml. The dense slurry containing 900 gms. milled cellulose (less than 25 micron particle size) and 3,000 ml. of the concentrated cellulase solution was prepared and the reaction was started in a glass reactor at 50° C. Following 48 hours of batch saccharification, 1,500 ml. of the reacting slurry was transferred into a 2,000 ml. (150 mm. diameter) membrane cell furnished with a membrane (30,000 cutoff) and the rest of the slurry was allowed to continue reaction in the reactor. The cell was pressurized up to 45 lbs. per sq. in. with $N_2$ gas from a cylinder and ultrafiltration of the slurry started by bringing into the cell a stream of water citrate buffered to a pH of 4.8 from a pressure supply vessel at a rate equal to the rate of filtration. The process was continued for 5 hours at room temperature (27° C.) during which the slurry volume inside the cell remained constant. This process of dilution and permeation brought the total sugar (as glucose) of the slurry from 14.21 to 6.1 percent; during the same period the reactor slurry increased its sugar content from 14.21 to 15.32 percent. The washed slurry was now transported back into the reactor and 95 gms. of fresh cellulose (dry, milled, less than 25 micron) was added into the reactor. The saccharification and product removal cycles were continued over a period of 10 days repeating the steps. The amount of total sugar (957.4 gm.) removed from the system over a period of 10 days (243 hours) with consecutive substrate feeding and product removal represented a yield of 54.3 percent sugar. However, only 43 percent of the reaction volume was handled for sugar removal while the rest was left in the reactor. This figure (54.3 percent), therefore, represents percentage removal of glucose from the system as a whole (3,500 ml.). The overall conversion of cellulose into glucose is 71.14 percent. This means that about 17 percent of the converted cellulose (sugars) remains in the system without removal. Paper chromatograms of the effluent from the membrane cell show that about 70 percent of the sugars is glucose and most of the rest is cellobiose with a very small amount of xylobiose. No difference in the monomer dimer ratio has been noticed in either the reactor samples, or in the membrane cell samples or even in the membrane effluent samples. This suggests that the two sugars are passed out of the system in the same ratio as they appear in the digest. The loss of the enzyme, in the system, if any, can be assumed to be due to a possible denaturation of the protein.

This invention provides a novel process for the rapid enzymatic hydrolysis of an insoluble substrate, cellulose into soluble sugar products, principally glucose, and at the same time, recovery of the sugar products, from the reaction mixture free of either enzyme or substrate. Thus, it is possible to reuse the enzyme, making use of its catalytic capabilities to the maximum extent.

I claim:

1. A continuous process for the enzymatic conversion of cellulose to simple sugars whereby the enzyme component is continually reused comprising the steps of
   a. reducing the particle size of substantially pure cellulose to less than 25 microns.
   b. concentrating cellulase enzyme obtained from a Trichoderma viride (QM 9123) culture filtrate to obtain a cellulase solution having an activity of at least 100 Cx units/ml.,
   c. combining dry cellulose, having a particle size of less than 25 microns and having a moisture content of less than 3 percent by weight, to the concentrated enzyme solution forming a dense slurry having a cellulose solids content of from 10 percent to 30 percent.
   d. agitating said cellulose-cellulase slurry under conditions which promote the hydrolysis of cellulose to simple sugars,
   e. continuously removing the sugar products formed in said cellulose-cellulase slurry by pressure filtration through a molecular sieve membrane which allows the passage of sugar in solution but retains cellulose and cellulase components, thereby preventing process inhibition that would result from an increasing glucose concentration, and
   f. adding fresh dry cellulose having a particle size of less than 25 microns and water in separate streams to make up for the cellulose hydrolyzed to sugar and for the water lost by filtration.

2. A process according to claim 1 wherein said cellulose-cellulase slurry is maintained at a temperature of from 40° to 60°C.

3. A process according to claim 2 wherein said cellulose-cellulase slurry is maintained at a temperature of about 50°C.

4. A process according to claim 2 wherein said cellulase activity is greater than 120 Cx units/ml.

5. A process according to claim 2 wherein the molecular sieve membrane has a cutoff range of from 2,000 to 30,000.

6. A process according to claim 2 wherein the water added to the system is buffered to a pH of 4.8 to 5.0.

* * * * *